G. H. DAY.
TEMPLE.
APPLICATION FILED SEPT. 13, 1917.
1,306,805.
Patented June 17, 1919.
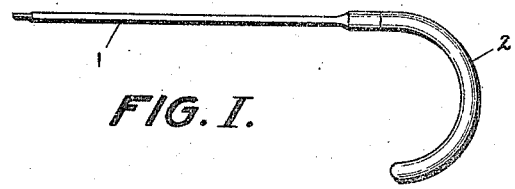
FIG. I.
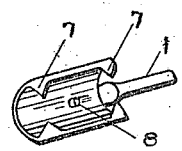
FIG. VII.
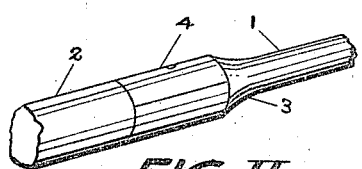
FIG. II.
FIG. VIII.
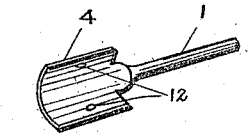
FIG. III.
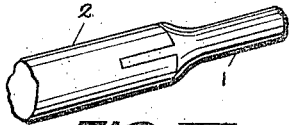
FIG. IV.
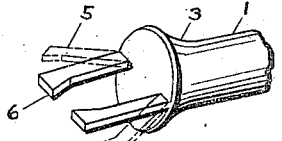
FIG. V.
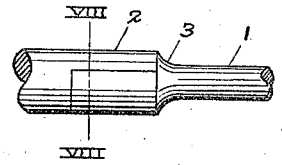
FIG. VI.
INVENTOR
GEORGE H. DAY
BY
H. H. Styll   H. H. Parsons
ATTORNEYS

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

TEMPLE.

1,306,805.  Specification of Letters Patent.  Patented June 17, 1919.

Application filed September 13, 1917. Serial No. 191,177.

*To all whom it may concern:*

Be it known that I, GEORGE H. DAY, a citizen of the United States, residing at Southbridge, in the county of Worcester and State of Massachusetts, have invented certain new and useful Improvements in Temples, of which the following is a specification.

My invention relates to improvements in temples for ophthalmic mountings and has particular reference to an improved construction of temple comprising both metallic and non-metallic parts.

The leading object of the present invention is the provision of an improved joint for uniting a metallic temple side to a non-metallic temple or ear hook section.

A further object of the present invention is the provision of an improved construction of temple side having means formed or secured integral therewith for interlocking with a non-metallic side and in which the joint may be formed without heating of the parts if desired.

Other objects and advantages of my improved construction should be readily apparent by reference to the following specification taken in connection with the accompanying drawings and it will be understood that I may make any modifications in the specific details of construction shown and described within the scope of the appended claims without departing from or exceeding the spirit of my invention.

Figure I represents a view of a temple constructed in accordance with and embodying my invention.

Fig. II represents an enlarged detail view of the joint portion thereof.

Fig. III represents a perspective view of the metallic portion of the joint in condition for attachment.

Fig. IV represents a view of a slightly different joint.

Fig. V represents a perspective view, the initial position of the metallic parts being indicated in dotted and the final position being indicated in full lines.

Fig. VI represents a fragmentary view of another form of joint.

Fig. VII represents a perspective detail view of the joint in Fig. VI.

Fig. VIII represents a sectional view as on the line VIII—VIII of Fig. VI.

In the drawings, in which similar characters of reference have been employed to denote corresponding parts throughout the several views, the numeral 1 designates the temple side and the numeral 2 the tip or ear hook portion.

In that form of construction illustrated in Fig. II, I have shown the side as provided with the enlarged or flaring portion 3 having abutting thereagainst the terminus of the ear hook 2 and having integral therewith the band or ferrule 4, which in the finished joint is clamped tightly around and preferably with sufficient pressure to become slightly embedded in the material of the tip 2 to firmly secure the tip or ear hook portion to the side 1. It will be noted from the illustration in Fig. III that the ferrule 4 is provided with openings indicated by the numeral 12 whereby, when the ferrule is tightly clamped around the terminus of the ear hook, the material of the hook will be forced into these openings 12 and thus securely prevent any relative movement on the part of the ferrule with respect to the ear hook.

In Figs. IV and V, I have illustrated a modified form of construction in which the portion 3 in place of being provided with the single band or ferrule 4 is provided with the pair of normally outwardly flaring fingers 5 having the prongs or heads 6, these fingers being adapted to lie one each side of the member 2 as it is brought against the flaring portion 3 of the side and to be then pressed together and caused to bite downward into the material 2 to form the completed joint illustrated in Fig. IV, thus firmly clamping and securing the tip 2 to the side 1.

In Figs. VI to VIII inclusive I have shown a slight variation of the form illustrated in Figs. II and III, in that the band or ferrule 4 in place of extending entirely around the tip 2 extends but partially therearound and terminates in the prongs 7 adapted to be forced to bite into the sides of the part 2, in this form of the construction the ferrule being preferably disposed to lie on the outer side of the temple when in use, to present a neat and ornamental appearance as the mounting is viewed on the face, while on account of the forcing of the prongs and adjacent edges of the band 4 into the sides of the temple none of the material at this point comes into contact with the head of the wearer, the xylonite only, therefore, contacting with the face and the metal being outward away therefrom. If desired, in connection with this form a rivet or stud 8 may be secured in or driven through the wire of the ferrule and partially through the part 2 at the joint to aid in securing the parts against separation or twisting movement.

From the foregoing description taken in connection with the accompanying drawings, the several forms of my improved joint should be readily understood, and it will be seen that in all forms the metallic part of the joint is preferably integral with the side 1 and it is preferred to have the enlargement 3 of substantially the diameter of the part 2 at the joint, against which the end of the part 2 may abut to make a neater and more satisfactory construction, less liable to catch on the hair of the wearer and less liable to cause discomfort to the wearer, and that on account of my improved manner of attachment or formation of the joint the several parts may be readily assembled without the use of heat softening one or other of the parts with the attendant liability of subsequent chilling of the non-metallic member after being heated, thus impairing the efficiency of the joint.

I claim:

1. As an improved temple or ophthalmic mounting, the combination with a metallic side having a flared terminal portion, of a non-metallic tip abutting the flared terminus of the metallic side, and means carried by said terminus adapted to embrace and exteriorly clamp the non-metallic member against the metallic member to form a substantial continuation of the flared portion of the side and secure the tip to the side.

2. As an improved temple for an ophthalmic mounting, the combination with a metallic side having a flared terminal portion, of means integral with and projecting beyond said terminal portion, and a non-metallic member abutting the flared terminus of the metallic side, said means being exteriorly clamped against the non-metallic tip to form a substantial continuation of the flared portion of the side and secure the tip to the side.

3. In an ophthalmic mounting, the combination with a non-metallic tip, of a metallic side having a flared end and a band integral with the flared end and projecting therebeyond adapted to embrace and interlock with the non-metallic tip to secure the same to the temple side.

4. In an ophthalmic mounting, the combination with a non-metallic tip, of a metallic side having a flared end, and means integral with and projecting beyond said flared end for clampingly engaging and interlocking with the non-metallic tip to secure the same to the temple side and to provide a smooth and unbroken joint.

In testimony whereof I have affixed my signature, in presence of two witnesses.

GEORGE H. DAY.

Witnesses:
E. M. HALVORSEN,
E. M. LAFLER.

Copies of this patent may be obtained for five cents each, by addressing the "Commissioner of Patents, Washington, D. C."